(12) United States Patent
Nakashima et al.

(10) Patent No.: US 6,848,713 B2
(45) Date of Patent: Feb. 1, 2005

(54) AIRBAG GAS PRODUCER

(75) Inventors: Yoshihiro Nakashima, Hyogo (JP); Nobuyuki Katsuda, Hyogo (JP)

(73) Assignee: Daicel Chemical Industries, Ltd., Osaka (JP)

( * ) Notice: Subject to any disclaimer, the term of this patent is extended or adjusted under 35 U.S.C. 154(b) by 163 days.

(21) Appl. No.: 10/275,004

(22) PCT Filed: Jun. 21, 2001

(86) PCT No.: PCT/JP01/05321
§ 371 (c)(1),
(2), (4) Date: Oct. 31, 2002

(87) PCT Pub. No.: WO01/98114
PCT Pub. Date: Dec. 27, 2001

(65) Prior Publication Data
US 2003/0184068 A1 Oct. 2, 2003

(30) Foreign Application Priority Data
Jun. 22, 2000 (JP) .................................. 2000-187147
Jun. 19, 2001 (JP) .................................. 2001-185440

(51) Int. Cl.⁷ .............................................. B60R 21/26
(52) U.S. Cl. ................. 280/741; 102/202; 102/202.1; 102/202.3; 102/202.5; 280/735
(58) Field of Search ....................... 280/741, 735, 280/736, 742; 102/202, 202.1, 202.2, 202.3, 202.5

(56) References Cited

U.S. PATENT DOCUMENTS

| 3,744,815 A | 7/1973 | Scherenberg |
| 5,404,263 A | 4/1995 | Graves et al. |
| 6,007,096 A | 12/1999 | Shirk et al. |
| 6,315,322 B1 * | 11/2001 | Mika .......................... 280/736 |

FOREIGN PATENT DOCUMENTS

| JP | 11-59318 A | 3/1999 |
| JP | 11-217055 A | 8/1999 |
| JP | 2001-163169 A | 6/2001 |
| JP | 2001-225712 A | 8/2001 |
| WO | WO 00/18618 A1 | 4/2000 |
| WO | WO 01/03979 A1 | 7/2000 |
| WO | WO 01/07300 A1 | 7/2000 |

* cited by examiner

Primary Examiner—Eric Culbreth
(74) Attorney, Agent, or Firm—Birch, Stewart, Kolasch & Birch, LLP

(57) ABSTRACT

A gas generator for an air bag comprises: a housing having a gas discharging port; an initiator assembly provided with a first igniter and a second igniter mounted to the housing via a holder, each of the first igniter and the second igniter including a priming activated upon an impact, the second igniter having, a center pin connected to an external power supply to constitute a positive electrode, a grounding pin connected to a metal portion of a motor vehicle to constitute a negative electrode, and an opening-shutting device of current provided between the center pin and the external power supply; and gas generating material ignited and burnt by the initiator assembly.

9 Claims, 6 Drawing Sheets

AIRBAG GAS PRODUCER

CROSS-REFERENCE TO RELATED APPLICATION

This application is the national phase under 35 U.S.C. § 371 of PCT International Application No. PCT/JP01/05321 which has an International filing date of Jun. 21, 2001, which designated the United States of America.

BACKGROUND OF THE INVENTION

1. Field of the Invention

The present invention relates to a gas generator for an air bag and an air bag system using the same.

2. Description of Related Art

As a gas generator for an air bag, there are a pyrotechnic-type gas generator in which only a gas generated by combustion of a gas generating agent is used for inflating an air bag, and a hybrid-type gas generator in which a gas generated by combustion of a gas generating agent and a pressurized medium are used for inflating the air bag. In the gas generator for the air bag, ignition means provided with an igniter is employed as means for generating a gas by combusting the gas generating agent, and a single-type gas generator with one igniter and a dual-type gas generator with two igniters are used at present.

In the case of a dual-type gas generator with two igniters, two conductive pins (a center pin and a grounding pin) of the positive electrode and the negative electrode are provided in the respective igniters. By electrifying the respective conductive pins, a priming is ignited and burnt at conductive wires (namely, heat generating wires, electric resistance wires or the like), which connect the two conductive pins, in the course of current flows from the positive electrodes to the negative electrodes and the gas generating agents are burnt, in some cases, through ignition and burning of transfer charges.

As such a dual type gas generator for the air bag, there is one which is adjusted to activate only one igniter or to activate both igniters according to the magnitude of an impact on the vehicle. In this case, it is important that the other igniter is not activated erroneously when the magnitude of impact is relatively small and only one igniter is actuated.

SUMMARY OF THE INVENTION

An object of the present invention is to provide a gas generator for an air bag in which an erroneous activation of a second igniter due to an actuation of a first igniter can be prevented with increased reliability, and an air bag system using the same.

As a solution, the present invention provides a gas generator for an air bag which comprises, a housing having a gas discharging port, an initiator assembly provided with first and second igniters mounted to the housing via a holder, each of the first and second igniters including a priming activated upon an impact, the second igniter having,
  a center pin connected to an external power supply to constitute a positive electrode,
  a grounding pin connected to a metal portion of a motor vehicle to constitute a negative electrode, and
  opening-shutting means of current provided between the center pin and the external power supply; and
gas generating means ignited and burned by the initiator assembly.

The second igniter constituting the ignition means can be adjusted to be activated simultaneously with the first igniter or to be activated after the first igniter is activated.

In this invention, the grounding pin and the center pin are connected to each other by a conductive wire (that is, a heat generating wire, an electric resistance wire or the like) at positions where one end portion of each pin makes contact with the priming, and the priming is ignited and burnt by electrifying the conductive wire. Furthermore, the grounding pin is a conductive pin that makes contact with a conductive body (for example, a metallic eyelet), and the center pin is a conductive pin insulated from the conductive wire by glass or the like. Incidentally, the conductive pin serving as the negative electrode is connected to a metal portion of a vehicle to ground. For example, the grounding pin may be electrically connected to a metal portion constituting an outer shell vessel of the igniter, and the center pin may be electrically connected to the grounding pin only via an electric resistance wire. Here, electrical connection means is connected to the pins directly or indirectly via another conductive member.

In the gas generator for an air bag of the present invention, the center pin of the second igniter is set to the positive electrode and the grounding pin is set to the negative electrode. Accordingly, when (+) current flows from the first igniter to the conductive member (the metallic eyelet), the (+) current flows to the grounding pin of the negative electrode to be discharged due to grounding, and thereby the second igniter can never be activated erroneously.

Further, the gas generator for an air bag of the present invention is provided with opening-shutting means for selectively allowing or preventing current from flowing to the center pin of the second igniter from the external power supply. In case that only the first igniter is activated, the opening-shutting means is open and current does not flow into the center pin, so that current is prevented from flowing from the center pin of the second igniter to the negative electrode of the first igniter via the conductive wire (that is, a heat generating wire, an electric resistance wire or the like). Accordingly, the second igniter can never be activated erroneously.

Since the gas generator for an air bag of the present invention is arranged such that the positive electrode and the negative electrode of the conductive pins are arranged as described above in the two igniters, and due the opening-shutting means of current, the present invention is not particularly limited to the structure of the gas generator for an air bag itself, but, for example, the ignition means can be constituted as the following initiator assembly.

In the present invention, the initiator assembly may further include a transfer charge,
  a collar assembly retaining the initiator assembly to the gas generator, and
  preferably, the collar assembly has an insulating material surrounding at least a portion of each of the first and second igniters and a collar joined to the insulating material.

Incidentally, the collar forming the collar assembly, that is, a holder, may be any member having a function serving as a collar (a space retaining function), and preferably it is made of ceramics or metal; more preferably, it is made of metal.

Further, preferably, at least one of the first and second igniters includes, a metallic eyelet having a hole through which one of the center pin and the grounding pin passes, and an electrically insulating body filled in the hole to insulate the conductive pin from the eyelet are provided such that the end faces thereof exist on the same plane.

Next, a preferable initiator assembly used in the gas generator for an air bag of the present invention will be explained.

When the initiator assembly is activated by an ignition signal received by the conductive pin of the initiator, it ignites and burns the priming disposed in the vicinity of the conductive pin. The initiator assembly includes the first and second igniters, and the collar assembly joined thereto. In addition to the at least one conductive pin, the first and second igniters each have a charge holder formed by using a cap member (cover member) comprising a metallic wall or a resin surrounding the priming ignited when an ignition signal is received. The collar member retains the initiator assembly to the housing of the inflator even after the initiator assembly is activated.

The collar assembly includes an injection-molded insulating material and a collar, and the collar is fixed and joined to the insulating material made of an injection-molding plastic material during an injection-molding process.

The insulating material is useful for insulating one conductive pin from the second conductive pin, or in another embodiment, it is useful for insulating one conductive pin from another conductive component in a different electric potential therefrom when the one conductive pin receives an ignition signal.

The collar is a single integral piece which can be defined to include a body portion and a shoulder portion. The body portion is arranged so that a front end annular cylindrical portion thereof is fitted and fixed on the outer periphery of the insulating material made of a molding plastic material injection-molded to surround conductive pins, generally two conductive pins comprising the center pin and the grounding pin. The conductive pins extend inside a cylindrical portion extending rearward. Then, the inner space of the rearward cylindrical body receives a connector connected to the conductive pins. In this collar, it is preferable that the inner circumferential surface of the cylindrical body portion extending rearward (that is, a rear half) is formed not to be covered with an insulating material (that is, injection-molded resin or the like), exposing the collar. This is for securely eliminating a possibility such that a connector disposed in the inner space of the cylindrical portion drops off due to, for example, the impact of activation of the first and second igniters.

The shoulder portion is expanded outwardly in the radial direction from the rearward cylindrical portion of the body portion to be contact-engaged with an engaging portion of the housing of the inflator. The mutual engagement between the shoulder portion and the engaging portion of the inflator housing controls the relative positioning of the initiator assembly to the inflator housing before and after activation of the initiator assembly. The outward position of the shoulder portion defines the length or the dimension of the outside of the collar.

In the initiator assembly of this invention, the priming is stored in a charge holder made of a cover member comprising a cylindrical metallic wall, a resin or the like mounted to a metallic eyelet (end plate), the metallic eyelet has a cylindrical shape with a hole, and the hole formed in a center of the eyelet is filled with an electrical insulator (comprising glass).

The center pin of the electrode extends through the insulating material in the collar, then goes through a electrical insulating body in the eyelet, and the front end thereof makes contact with the priming. Also, the upper surface of the eyelet also makes contact with the priming, and the front end of the second conductive pin, namely the grounding pin of the electrode is connected to the lower surface of the eyelet in a state of being able to be electrified. As the priming stored in the cover member or the charge holder, a material of zirconium-potassium perchlorate can be used. A means for igniting the priming on the basis of an ignition signal is provided between the center pin described above and the eyelet. That is, the means comprises a resistance wire connected between the both. The initiator assembly used in the present invention has the following features.

(1) The end surfaces of the center pin, the eyelet, and the electrical insulating material are on the same plane, and they are integrally fixed by molding a resin together with the collar, thereby forming a pin-type. The pin-type is an igniter in which the conductive pins project in the collar assembly, particularly, in the inner space of the rearward cylindrical body of the body portion in the collar, and the conductive pins and lead wires are connected by receiving and engaging the connector at the front ends of lead wires in the inner space of the rearward cylindrical body in the body portion, and thereby the both are made conductive. Such a pin-type aims to downsize the initiator and make the initiator handy by attaching the connector and the lead wires separately afterwards. In such a pin-type, by positioning the end surfaces of the center pin, the eyelet and the insulating body on the same plane, the initiator assembly which is easily manufactured and in that a manufacturing cost is not increased is realized.

That is, the igniter activated by an electric signal needs to have a structure for igniting and burning the priming by an electrical activation signal, and an electric resistance body (resistance wires in the present specification) for converting electric energy (that is, an electric signal) to heat energy is used as such a structure. The resistance wires are provided to connect one conductive pin and another conductive component (for example, another conductive pin or an eyelet) having a different electrical potential therefrom when the one conductive pin receives the ignition signal, and preferably at this time, the resistance wire is provided straight without sagging between the conductive pin and the conductive component. If the end surfaces of the center pin, the eyelet and the insulating body are on the same plane, by pulling and welding the resistance wires to the conductive pin and the conductive component, the resistance wires can be arranged to abut the flat end surfaces of the center pin, the eyelet and the insulating body without sagging. That is, the resistance wires can be connected to the conductive pin and the conductive component easily and securely.

(2) As the insulating material surrounding a portion of the initiator, a plastic material which can be injection-molded is used. As such a resin, nylon 6/12 resin, polybutylene terephthalate (PBT) resin, or polyacetal resin is used. By using these resins, the insulating resistance is increased as compared with nylon 6 resin which has been used conventionally, so that insulation between the conductive pins and between the conductive pins and the collar can be obtained securely.

(3) In order to increase friction between the inner cylindrical member of the inflator and the initiator assembly, and prevent rattling or rotation of the initiator assembly so that a crimping process of the inner cylindrical member is facilitated, a projection is formed on the outer periphery of the insulating material (molded resin portion) surrounding the metallic eyelet (end plate). It is preferable that the projection is formed in one of various cone shapes such as a circular cone, a pyramid or the like, but even another shape can be employed as long as it can be fitted in between the inner cylindrical member and the initiator assembly to increase the frictional resistance therebetween. Also, the projection is formed to have a size slightly larger than a gap obtained between the inner cylindrical member and the initiator assembly, and it is formed to be collapsed or flexed and press-fitted between the initiator assembly and the inner cylindrical member, when the initiator assembly is joined to one end of the inner cylindrical member. In order to secure such a function, for example, when the width of the gap is 0.75 mm, the function can be realized by forming the projection in a size larger than the gap by 0.1 to 0.2 mm or so.

(4) The center pin and the grounding pin in the connecting space with the connector in the collar are arranged such that they do not project out of the collar in order to prevent the pins from deforming during assembling the initiator assembly.

(5) Connector dropping-out preventing means is provided in the connecting space with the connector in the collar. For this, it is sufficient to provide a recessed notch inside the collar.

(6) In order to coincide the conductive pins (the grounding pin and the center pin) and the connector with each other regarding positive and negative electrodes, a D feature type or T feature type projection is provided in the connecting space. More particularly, a projection or recess in a D-letter or T-letter shape is formed on the insulating material (molded resin) exposing to the bottom surface of the connector connecting space.

(7) The inside of the collar is not covered with the injection-molded insulating material (molding plastic material), and the connector is fitted to make contact directly with the metal surface of the inside of the collar. Thereby, the connector can be prevented from falling out due to the reaction of activation of the igniter.

(8) Mounting means for a connector having lead wires is provided to direct the lead wires towards a predetermined direction with respect to the gas generator. Specifically, recesses or projections extending in the axial direction are provided on an edge portion of the collar in asymmetrical manner.

The gas generator for an air bag of the present invention may have a structure such that an air bag is inflated by only a combustion gas generated by combustion of the gas generating means.

Also, the present invention provides an air bag system including a gas generator for an air bag, an impact sensor for detecting an impact to activate the gas generator, an air bag introduced therein a gas generated in the gas generator and/or a pressurized medium to inflate, wherein the gas generator for an air bag is the gas generator for an air bag described above.

Particularly, the air bag system in the present invention can be provided with the following structure.

That is, an air bag system is an air bag apparatus comprising a gas generator for an air bag accommodating ignition means in a housing having a gas discharging port and an activation-signal outputting device for outputting an electrical-activation signal to the gas generator, wherein the ignition means is provided with a first igniter and a second igniter activated by the electrical activation-signal and the first and second igniters are mounted to the housing via a holder, the igniter comprises a grounding pin electrically connected to a metal portion of an outer shell in the igniter and a center pin electrically connected to the grounding pin via only an electric resistance wire, and the activation-signal outputting device is provided with an opening-shutting means controlling the output of the activation-signal to each igniter, and in the second igniter, the center pin is connected to activation-signal outputting means to serve as the positive electrode.

The activation-signal outputting means described above is a device which can output an electrical activation-signal to at least the igniter, and one provided as a control unit conventionally or one provided by being combined with the control unit and an impact sensor or the like can be used as such means.

The present invention also provides a method of receiving an activation-signal in a gas generator for an air bag activated by receiving an electrical activation-signal.

That is, in the method of receiving an activation-signal, a gas generator comprises ignition means in a housing having a gas discharging port, the ignition means is provided with a first igniter and a second igniter activated by an electrical activation-signal, the first and second igniters are mounted to the housing via a holder, and the igniter comprises a grounding pin electrically connected to a metal portion of an outer shell of the igniter and a center pin electrically connected to the grounding pin via only an electric resistance wire, and in the second igniter, the center pin serves as the positive electrode to receive the electric activation-signal.

In the gas generator for an air bag of the present invention, there is no possibility that the second igniter may be activated erroneously by activation of the first igniter.

DETAILED DESCRIPTION OF THE INVENTION

Figure 1:
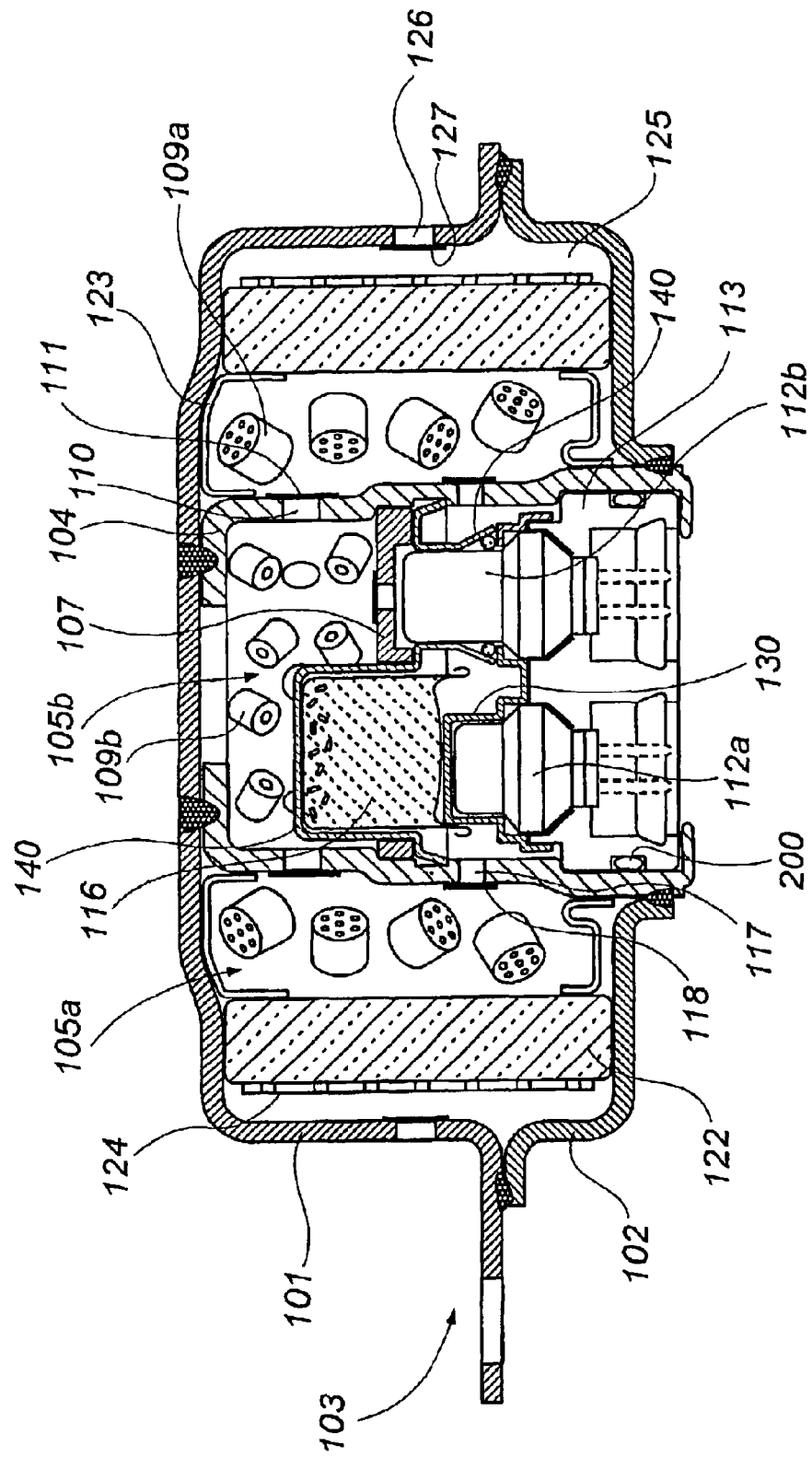
FIG. 1 is a vertical cross sectional view of a gas generator for an air bag of one embodiment of the present invention.
Figure 2:
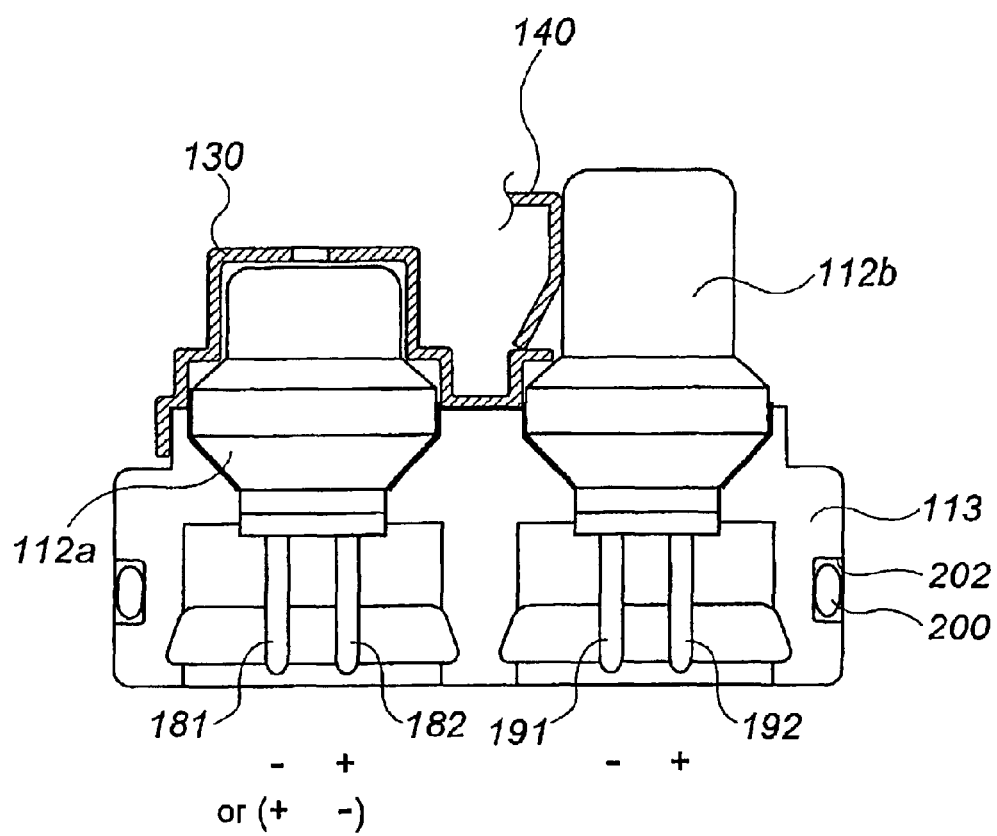
FIG. 2 is a vertical cross sectional view of ignition means shown in FIG. 1.
Figure 3:
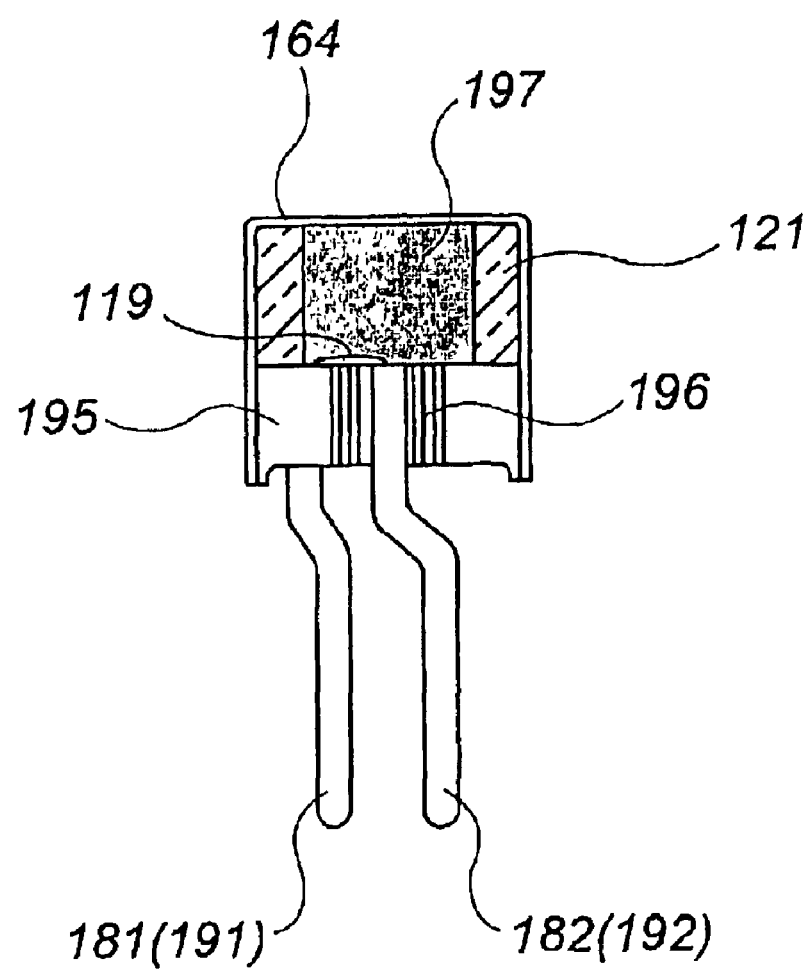
FIG. 3 is a cross sectional view for explaining the structure of the ignition means.

A first embodiment of a gas generator for an air bag of the present invention will be explained with reference to FIG. 1 to FIG. 3. FIG. 1 is a vertical cross sectional view of a gas generator for an air bag, FIG. 2 is a vertical cross sectional view of an igniter shown in FIG. 1, and FIG. 3 is a cross sectional view for explaining an inner structure of the igniter. FIG. 1 shows a pyrotechnic type gas generator for an air bag in which only a gas generated by combustion of a gas generating agent inflates an air bag.

In the gas generator shown in FIG. 1, a substantially cylindrically-shaped inner cylindrical member 104 is arranged in a housing 103 formed by joining a diffuser shell 101, having a gas discharging port, and a closure shell 102 forming an inner accommodating space together with the diffuser shell. The inner accommodating space outside the inner cylindrical member 104 is a first combustion chamber 105*a*.

A stepped notch portion is provided inside the inner cylindrical member 104 receives a disk-like partition wall 107. A space in the inner cylindrical member 104 is partitioned into two chambers by the partition wall 107 such that a second combustion chamber 105b is defined in the diffuser shell side (the upper space) and a space for accommodating ignition means is defined in the closure shell side (the lower space).

Gas generating agents 109a and 109b, which are burnt by the ignition means activated due to an impact to generate a combustion gas, are stored in the first and second combustion chambers 105a and 105b, and the ignition means is provided with a first igniter 112a and a second igniter 112b which are activated due to the impact for ignition.

The first igniter 112a and the second igniter 112b are activated by an activation-signal output on the basis of a sensor detecting an impact, and they are provided in parallel in an initiator collar 113 serving as a holder, having their head portions exposed. The first igniter 112a and the second igniter 112b are fixed to the initiator collar 113 by a metallic pressing member 130 from the above.

As shown in FIG. 2, the first igniter 112a has a grounding pin 181 (a negative electrode (or a positive electrode)) and a center pin 182 (a positive electrode (or the negative electrode)). One end of the grounding pin 181 and the center pin 182 are connected electrically to each other by a bridge wire 119 which is a conductive wire such as an electric resistance wire or the like at the portions thereof in contact with a priming 197 as shown in FIG. 3. The other end of the grounding pin 181 is connected to a metal portion of a motor vehicle via a connector to ground, while the other end of the center pin 182 is connected to an external power supply via the connector. Furthermore, a part of the grounding pin 181 is connected to a metallic eyelet 195; and the center pin 182 is insulated from the metallic eyelet 195 by a glass 196. A bridge wire (an electric resistance wire) 119 is connected between the one end of the center pin 182 and the one end of the eyelet, and the bridge wire 119 is in contact with a priming 197. Thereby, when the center pin 182 is electrified, current flows through the bridge wire 119 so that the priming 197 is ignited. Further, the first igniter 112a has a structure such that the priming 197 and a charge holder 121 are disposed inside a metallic cover member 164. The cover member 164 and the eyelet 195 make contact with each other. The cover member 164 can be covered with a thin film to provide electrical insulation.

The second igniter 112b has a grounding pin 191 (a negative electrode) and a center pin 192 (a positive electrode). One end of the grounding pin 191 via the eyelet 195 and one end of the center pin 192 are connected to each other by a bridge wire 119, which is a conductive wire such as an electric resistance wire or the like, at the portions thereof in contact with a priming 197. The other end of the grounding pin 191 is connected to a metal portion of the motor vehicle via a connector to ground, while the other end of the center pin 192 is connected to an external power supply via the connector. Opening-shutting means (a switch) of current (not shown) is provided between the center pin 192 and the external power supply. Furthermore, a part of the grounding pin 191 is connected to a metallic eyelet 195, and the center pin 192 is insulated from the metallic eyelet 195 by a glass 196. A bridge wire (electric resistance wire) 119 is connected between the one end of the center pin 192 and the eyelet 195, which is electrically connected to the grounding pin 191, and the bridge wire 119 is in contact with a priming 197. Thereby, when the center pin 192 is electrified, current flows through the bridge wire 119 so that the priming 197 is ignited. Further, the second igniter 112b has a structure such that the priming 197 and a charge holder 121 are disposed inside a metallic cover member 164, and the cover member 164 and the eyelet 195 make contact with each other. Also, the cover member 164 can be covered with a thin film to provide electrical insulation.

A transfer charge 116 accommodated in an aluminum cup is disposed above the first igniter 112a, and the transfer charge 116 is separated from the second combustion chamber 105b by a substantially cylindrical partition member 140 and the partition wall 107. A flame-transferring hole 117 is provided in the inner cylindrical member 104, and the hole 117 is closed by a seal tape 118.

A through-hole 110 is provided in the inner cylindrical member 104 defining the first combustion chamber 105a and the second combustion chamber 105b, and the through-hole is closed by a seal tape 111. Incidentally, since the seal tape 111 is ruptured when the gas generating agent is burnt, both the combustion chambers can communicate with each other through the through-hole 110. An opening area of the through-hole 110 is larger than that of the gas discharging port 126, and it does not have a function for controlling the internal pressure in the second combustion chamber 105b.

A common coolant-filter 122 for purifying and cooling combustion gases generated by combustion of the first and second gas generating agents 109a and 109b is disposed in the housing 103, and an inner circumferential surface of the filter 122 in the diffuser shell 101 side is covered with a short-pass preventing member 123.

Outside the coolant-filter 122, an outer layer 124 for suppressing expansion of the filter 122 due to passing of the combustion gas or the like is disposed. The outer layer 124 can be made of, for example, a laminated wire mesh body.

A gap 125 is formed outside the outer layer 124 such that the combustion gas can pass through all portions of the filter 122. A gas discharging port 126 formed in the diffuser shell is closed by a seal tape 127 in order to block the outside air.

When the center pin 182 of the first igniter 112a is electrified, current flows into the grounding pin 181 via the bridge wire 119, the priming 197 is ignited and burnt in the course, and then the transfer charge 116 is ignited and burnt. Then, the seal tape 118 is ruptured by a high-temperature gas generated by combustion of the transfer charge 116. The high temperature gas flows through the flame-transferring hole 117 into the first combustion chamber 105a to ignite the first gas generating agent 109a, and thereby a gas is generated.

In this case, when the priming 197 is ignited and burnt by activation of the first igniter 112a, the metallic pressing member 130 may break by a pressure of that combustion and the broken portion may make a bridge between the first igniter 112a and the second igniter 112b. In such a situation, (+) current can flow in the second igniter 112b via the pressing member 130, or the pressing member 130 and the partition member 140.

Also, in a case that the metallic cover member 164 accommodating the priming 197 in the first igniter 112a makes contact with the pressing member 130 to be electrified due to activation of the first igniter 112a, broken portions of the cover member 164 and the pressing member 130 may make a bridge between the first igniter 112a and the second igniter 112b. In such a situation, (+) current of the first igniter 112a can flow into the second igniter 112b via the pressing member 130, or the pressing member 130 and the partition member 140. At this time, even when an outer surface of the cover member 164 in both igniters is covered with a film having an insulation property (hereinafter, referred to as an insulating film), the same problem occurs when the film is broken.

Then, regarding the possibility that (+) current of the first igniter 112a flows into the second igniter 112b, even if the center pin in the first igniter 112a is set to (+) pole, a similar problem will occur when a tip end portion of the bridge wire connected to the center pin 182 makes contact with a conductive portion such as the cover member 164 or the like, for any reason, after activation of the first igniter 112a.

However, in the case that (+) current flows in the second igniter 112b in this manner, the (+) current flows in only the grounding pin 191, and it never flows in the center pin 192.

Furthermore, when only the first igniter 112a is activated, the opening-shutting means of current between the center pin 192 of the second igniter 112b and the external power supply is open so that current never flows in the center pin 192. In a case that the opening-shutting means is shut or there is no opening-shutting means, (+) current flows from the center pin 192 to the grounding pin 181 of the first igniter 112a through the bridge wire 119 and the bridging broken portion. In that course, the priming 197 is ignited so that the second igniter 112b may be activated erroneously.

As mentioned above, in the present invention, since the center pin 192 of the second igniter 112b is set to the positive electrode and the opening-shutting means of current is provided between the center pin 192 and the external power supply, an erroneous activity of the second igniter 112b can be prevented unfailingly.

Figure 4:
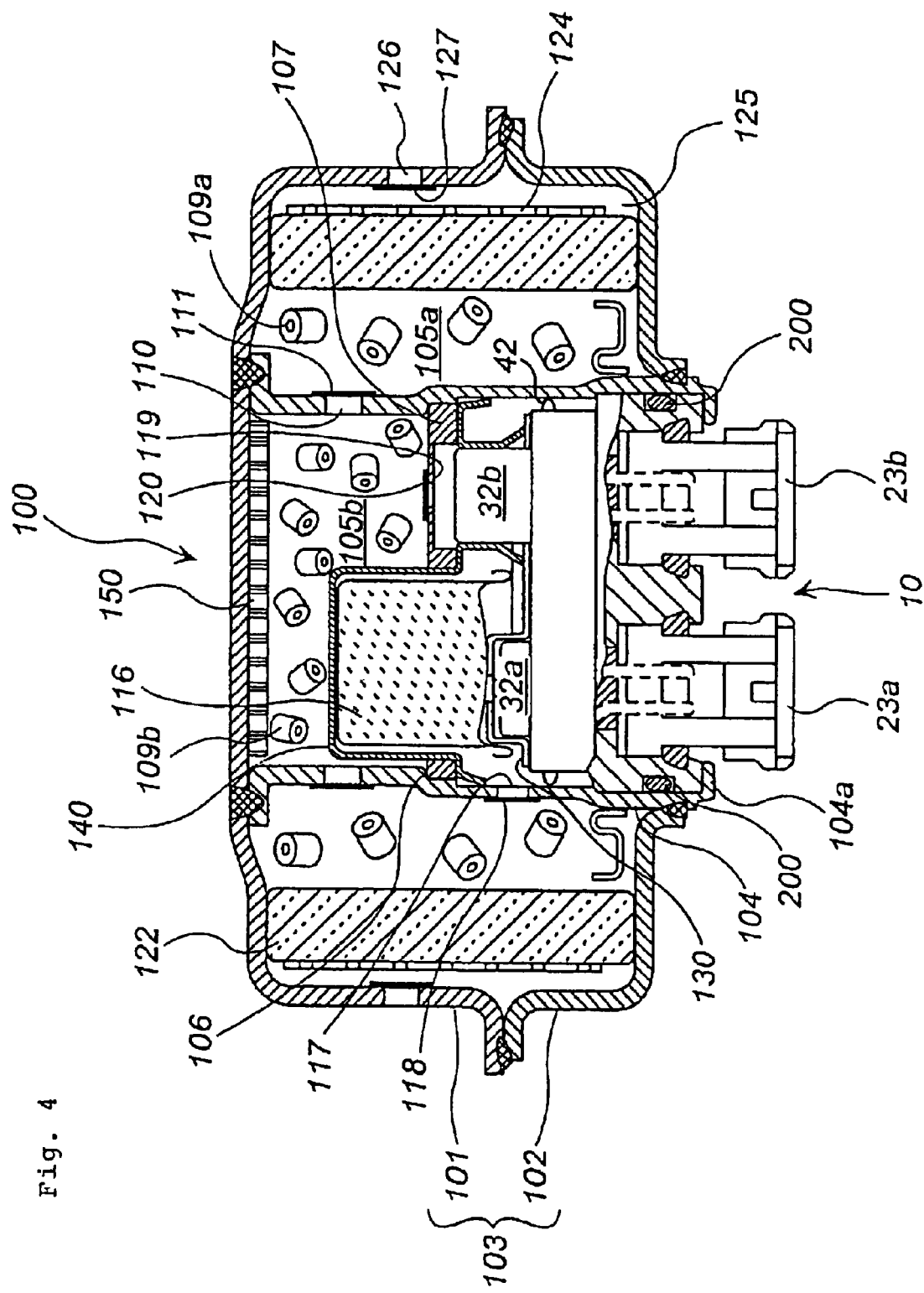
FIG. 4 is a vertical cross sectional view of a gas generator for an air bag of another embodiment of the present invention.
Figure 5:
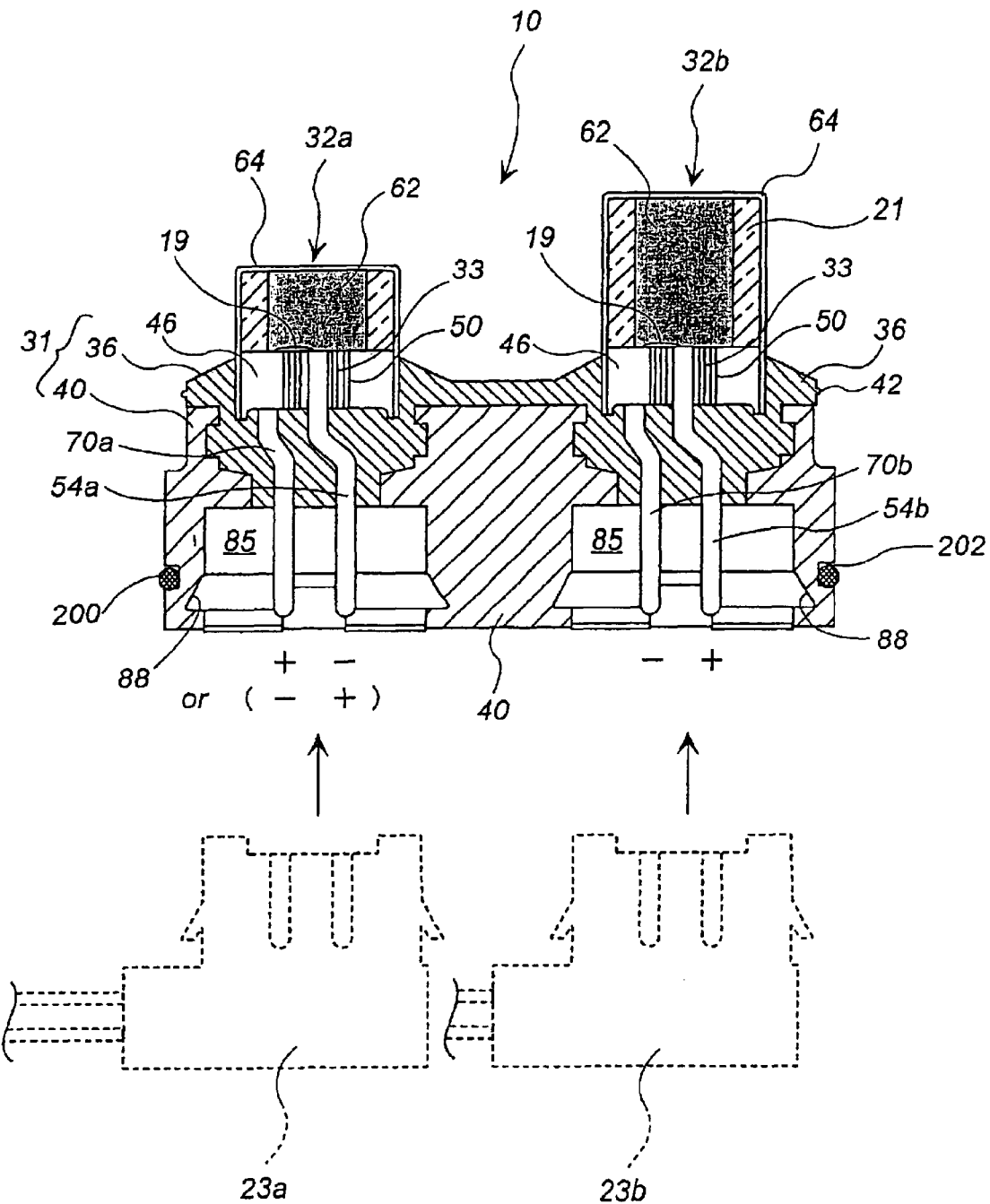
FIG. 5 is a cross sectional view of ignition means shown in FIG. 4.

Next, another embodiment of the gas generator for an air bag of the present invention will be explained with reference to FIG. 4 and FIG. 5. FIG. 4 is a vertical cross sectional view of a gas generator for an air bag according to another embodiment of the present invention, and FIG. 5 is a vertical cross sectional view of the initiator assembly shown in FIG. 4. FIG. 4 shows a pyrotechnic type gas generator for an air bag in which only a gas generated by combustion of a gas generating agent inflates an air bag. This gas generator is different in ignition means from the gas generator for an air bag shown in FIG. 1, but is approximately identical in other portions, so that only the ignition means will be explained.

The ignition means includes an initiator assembly 10 and a transfer charge 116 filled in an aluminum cup. The initiator assembly 10 is fitted into an inner cylindrical member 104 (in the space formed by the inner cylindrical member 104 and the partition wall 107), and it is mounted thereto by crimping a lower end portion 104a of the inner cylindrical member 104.

The initiator assembly 10 includes a first igniter 23a, a second igniter 23b and a collar assembly 31.

The collar assembly 31 includes a resin portion 36 made of a molding plastic material as a injection-molded insulating material and a metallic collar 40, and the base portions of the first igniter 32a and the second igniter 32b are surrounded by the resin portion 36.

The metallic collar 40 is joined to the resin portion 36. For joining the collar assembly 31 comprising the resin portion 36 and the metallic collar 40 integrally with the first igniter 32a and the second igniter 32b, an injection-molding process is employed. In this case, liquid-like or fluidized molding plastic material constituting the resin portion 36 is filled between the base portions of the first igniter 32a and the second igniter 32b and the metallic collar 40. When the plastic material is solidified, the metallic collar 40 is fixed to and retained to the resin portion 36, and the resin portion 36 is fixed on and retained to the first igniter 32a and the second igniter 32b.

A groove 202 is formed around a lower end portion of the metallic collar 40 of the initiator assembly 10, and an O-ring made of rubber, plastic or the like is fitted in the groove 202. Then, by arranging the O-ring 200 in this manner, moisture is prevented from entering from the contacting portion between the inner cylindrical member 104 and the initiator assembly 10 (metallic collar 40), so that the interior of the gas generator for an air bag is kept in a moisture-proof state. Thus, since the interior is kept in the moisture-proof state, the performance of the gas generating agents 109a and 109b is prevented from deteriorating due to moisture absorption. Furthermore, although the initiator assembly 10 includes the first initiator 32a and the second initiator 32b, it is necessary to provide only one O-ring 200. Therefore, the number of manufacturing steps for the initiator assembly 10 is not increased as compared with that for a gas generator having a single initiator, and moisture-proof of the former is substantially equal to that of the latter.

The first igniter 32a and the second igniter 32b include a metallic eyelet (end plate) 46 in which a hole 50 is formed. The first igniter 32a has a center pin 54a (the positive electrode (or the negative electrode)) and a grounding pin 70a (the negative electrode (or the positive electrode)), while the second igniter 32b has a center pin 54b (the positive electrode) and a grounding pin 70b (the negative electrode). Then, an unillustrated opening-shutting means of current is provided between the center pin 54b and an external power supply. Then, in the both igniters, bridge wires which are conductive wires, such as electric resistance wires, are disposed respectively between the center pins 54a and 54b and the eyelets 46, and are in contact with the priming 62. When current flows in the center pins 54a and 54b, the bridge wires generate heat to ignite the priming 62. Also, the cover member 64 may be covered with a thin film to provide an electrical insulation.

The upper portions of the center pins 54a and 54b go through holes 50, and the center pins 54a and 54b are positioned, insulated against the metallic eyelets 46 by glasses 33 corresponding to an electrical insulating body.

The center pins 54a and 54b transmit ignition signals for igniting the priming 62. The cover member 64 comprising a metal wall encloses or covers the priming 62 filled in the charge holder 21 and it is welded to the eyelet 46. It is preferable that a circular end portion of the cover member 64 is provided with notches so that it can be broken easily and unfailingly. Such notches can be formed as grooves of about 0.10 to 0.25 mm radially, in case that the cover member 64 is made of stainless steel (SUS305).

The grounding pins 70a and 70b are insulated from the center pins 54a and 54b, respectively, by glasses 33.

The resin portion 36 made of molding plastic material surrounds the metallic eyelets 46 of the first igniter 32a and the second igniter 32b, the center pins 54a, 54b and the grounding pins 70a, 70b, and in addition, the metallic collar 40 is mounted to the outside of the resin portion 36.

The resin portion 36 is resin-molded integrally, including the metallic collar 40. At this time, the end surfaces of the center pins 54a and 54b, the eyelets 46, the glasses 33 holding the center pins 54a and 54b in the holes 50 of the eyelets 46 are put on the same plane.

Also, a front end peripheral surface of the resin portion 36 and a front end peripheral surface of the metallic collar 40 surrounding the resin portion 36 form a continuous circumferential surface to be frictionally fitted into the inner cylindrical member 104 shown in FIG. 4, and a projection 42 is formed on a front end peripheral surface of the resin portion 36. The projection 42 increases the friction between the inner cylindrical member 104 and the initiator assembly 10, prevents rattling or rotation of the initiator assembly 10, and facilitates a crimping process of the inner cylindrical member 104.

The base portion of the resin portion 36, through which the center pins 54a, 54b and the grounding pins 70a, 70b pass, insulates the metallic collar 40 from the center pins 54a, 54b and the grounding pins 70a, 70b. The metallic collar 40 has cavities 85 inside, and a surface of the cavity 85 is not covered with the molding plastic material and the metallic collar is exposed.

The tip end portions of the center pins 54a, 54b and the grounding pins 70a, 70b protrude in the cavities 85 but the tip end portions are not exposed out of the cavities 85 of the metallic collars 40. This is for preventing the pins from being deformed during assembling the initiator. Connectors 23a and 23b shown in a chain line in FIG. 5 are fitted into and connected to the cavities 85. That is, the inside of the cavity 85 serves as a connecting portion in which the connector is fitted. A recessed notch 88 is provided inside the end portion of the connector connecting cavity 85 of the metallic collar 40 in the circumferential direction, thereby forming falling-out preventing means for the fitted connector.

When the center pin 54a of the first igniter 32a in the initiator assembly 10 is electrified, the current flows through the grounding pin 70a via the bridge wire 19, the priming 62 is ignited and burnt in the course, and then the transfer charge 116 is ignited and burnt. Consequently, the seal tape 118 is ruptured by a high temperature gas generated by combustion of the transfer charge 116, the high temperature gas enters the first combustion chamber 105a through the flame-transferring holes 117, and the first gas generating agent 109a is ignited and burnt to generate a gas.

In this case, when the priming 62 is ignited and burnt due to activation of the first igniter 32a, the metallic pressing member 130 may be broken by a pressure of that combustion and the broken portion may make a bridge between the first igniter 32a and the second igniter 32b. In such a situation, (+) current can flow in the second igniter 32b via the pressing member 130, or the pressing member 130 and the partition member 140.

Also, in a case that the metallic cover member 64 accommodating the priming 62 in the first igniter 32a makes contact with the pressing member 130 to be electrified due to activation of the first igniter 32a, broken portions of the cover member 64 and the pressing member 130 may make a bridge between the first igniter 32a and the second igniter 32b. In such a situation, (+) current of the first igniter 32a may flow in the second igniter 32b via the pressing member 130 or the like. At this time, even when an outer surface of the cover member 64 in both igniters is covered with a film having an insulation (hereinafter, referred to as an insulating film), the same problem occurs when the film is broken.

Then, regarding the possibility such that (+) current of the first igniter 32a flows in the second igniter 32b, even if the center pin in the first igniter 32a is set to (+) pole, a similar problem will occur when a tip end portion of the bridge wire connected to the center pin 54a makes contact with a conductive portion such as the cover member 64 or the like, for any reason, after activation of the first igniter 32a.

However, according to the present invention, if (+) current flows in the second igniter 32b in this manner, the (+) current flows in only the grounding pin 70b, and never flows in the center pin 54b.

Furthermore, when only the first igniter 32a is activated, the opening-shutting means of current between the center pin 54b of the second igniter 32b and the external power supply is open so that current is prevented from flowing in the center pin 54b. In a case where the opening-shutting means is shut or there is no opening-shutting means, (+) current flows from the center pin 54b to the grounding pin 54a of the first igniter 32a through the bridge wire 19 and the bridging broken portion. In such a case, the priming 62 is ignited so that the second igniter 32b may be activated erroneously.

As mentioned above, in the present invention, since the center pin 54b of the second igniter 32b is set to the positive electrode and the opening-shutting means of current is provided between the center pin 54b and the external power supply, an erroneous activity of the second igniter 112b can be prevented unfailingly.

Figure 6:
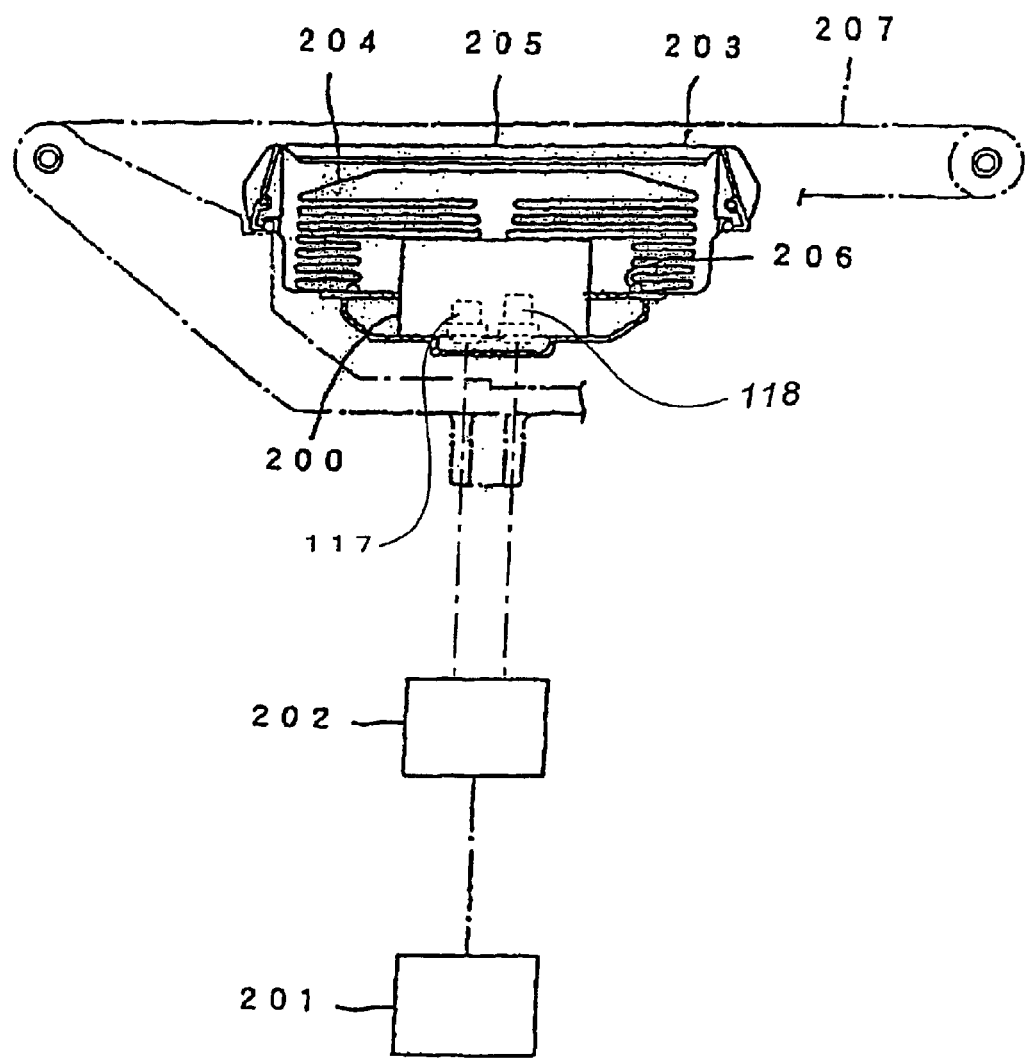
FIG. 6 is a schematic view showing an embodiment of an air bag system of the present invention.

An air bag system according to the present invention can use the pyrotechnic type gas generators shown in FIG. 1 and FIG. 4. Moreover, any gas generator according to the present invention can be used regardless of whether the gas generator is pyrotechnic or not. For example, when the gas generator for an air bag as shown in FIG. 1 is used, the air bag system may be provided with activation-signal outputting means comprising an impact sensor and a control unit, and a module case in which the gas generator and an air bag are accommodated. The gas generator is connected to the activation-signal outputting means (the impact sensor and the control unit) in the side where a first igniter 117 and a second igniter 118 as shown in FIG. 6, are provided. Then, in the air bag system thus structured, by properly setting the activation-signal outputting conditions in the activation-signal outputting means, an inflation speed of the air bag can be adjusted in accordance with a degree of an impact by activating only the first igniter 117, or activating the first igniter 117 and the second igniter 118 at different timings, or activating two igniters simultaneously.

More specifically, as shown in FIG. 6 which shows one embodiment of the air bag system of the present invention, the air bag system comprises a gas generator 200, an impact sensor 201, a control unit 202, a module case 203, and an air bag 204. As the gas generator 200, the gas generator described with reference to FIG. 1 is used, and the activating performance thereof is adjusted to give as little an impact as possible at the initial stage of activation of the gas generator.

The impact sensor 201 can comprise, for example, a semiconductor type acceleration sensor. In this semiconductor type acceleration sensor, four semiconductor strain gauges are formed on a beam of a silicon substrate that bends when acceleration is applied, and these semiconductor strain gauges are bridge-connected. When an acceleration is applied, the beam deforms and strain is produced on a surface of the beam. The resistances of the semiconductor strain gauges are changed due to this strain, the resistance change is detected as a voltage signal proportional to the acceleration.

The control unit 202 is provided with an ignition-judgment circuit, and a signal from the semiconductor type acceleration sensor is inputted to the ignition judgment circuit. The control unit 202 starts calculation at a time when the impact signal from the sensor 201 exceeds a predetermined value, and, when the calculated result exceeds a predetermined value, an activation-signal is outputted to the igniter of the gas generator 200, namely, the first igniter 117 or the second igniter 11B.

The module case 203 is made of, for example, polyurethane and it includes a module cover 205. The air bag 204 and the gas generator 200 are accommodated in the module case 203 to be constituted as a pad module. The pad module is ordinarily mounted to a steering wheel 207 when it is mounted in a driver side in an automobile.

The air bag 204 is made of nylon (for example, nylon 66), polyester or the like, the opening 206 thereof surrounds a gas discharging port of the gas generator, and the air bag is fixed to a flange portion of the gas generator in a folded state.

When the semiconductor type acceleration sensor 201 senses an impact at a time of collision of an automobile, the detection signal is transmitted to the control unit 202, and when the impact signal from the sensor exceeds the predetermined value, the control unit 202 starts calculation. When the calculated result exceeds the predetermined value, a working signal is output to the first igniter 117 or the second igniter 118 of the gas generator 200. Thereby, the igniter is activated to ignite the gas generating agent so that the gas generating agent is burnt to generate gas. This gas is injected to the air bag 204 and thereby the air bag breaks the module cover 205 to inflate such that a cushion absorbing the impact is formed between the steering wheel 207 and the occupant.

What is claimed is:

1. A gas generator for an air bag, comprising:
   a housing having a gas discharging port;
   an initiator assembly provided with a first igniter and a second igniter mounted to the housing via a holder, each of the first igniter and the second igniter including a priming activated upon an impact, the second igniter having,
      a center pin connected to an external power supply to constitute a positive electrode,
      a grounding pin connected to a metal portion of a motor vehicle to constitute a negative electrode, and
      switch means of current provided between the center pin and the external power supply; and
   gas generating means ignited and burnt by the initiator assembly to generate a combustion gas.

2. A gas generator for an air bag according to claim 1, wherein the initiator assembly further includes,
   a transfer charge,
   wherein the holder is joined to the insulating material.

3. A gas generator for an air bag according to claim 2, wherein, at least one of the first igniter and the second igniter includes,
   a metallic eyelet having a hole through which one of the center pin and the grounding, and
   an electrical insulating body for insulating the one of the center pin and the grounding pin passing through the hole from the metallic eyelet,
   wherein an end surface of the one of the center pin and the grounding pin, a surface of the metallic eyelet, and a surface of the electrical insulating body form a common plane.

4. A gas generator for an air bag according to claim 1, 2 or 3, wherein the gas generator inflates an airbag solely by a combustion gas generated by combustion of the gas generating means.

5. A gas generator for an air bag according to claim 1, wherein the second igniter is activated simultaneously with the first igniter or after an activation of the first igniter is activated.

6. A gas generator for an air bag according to claim 1, wherein the grounding pin is electrically connected to a metal portion constituting an outer shell vessel of the igniter, and the center pin is electrically connected to the grounding pin via only an electric resistance wire.

7. An air bag system, comprising:
   a gas generator for an air bag according to claim 1;
   an impact sensor for detecting an impact to activate the gas generator;
   an air bag having introduced therein a gas generated by the gas generator to inflate the air bag; and
   a module case accommodating the air bag.

8. An air bag system, comprising:
   an air bag apparatus including,
      a gas generator for an air bag having a housing provided with a gas discharge port, and ignition means attached to the housing, and
      an activation-signal outputting device for outputting an electrical activation-signal to the gas generator,
   wherein,
   the ignition means is provided with a first igniter and a second igniter activated by an electrical activation-signal, and the first igniter and the second igniter are mounted to the housing via a holder,
   each of the first igniter and the second igniter includes a grounding pin electrically connected to a metal portion of an outer shell vessel of the igniter, and a center pin electrically connected to the grounding pin only via an electric resistance wire and the metal portion,
   the activation-signal outputting device is provided with a switch means for controlling the output of the activation-signal to each igniter, and
   in the second igniter, the center pin is connected to the activation-signal outputting means to serve as a positive electrode.

9. A method of receiving an activation-signal in a gas generator for an air bag activated by receiving an electrical activation-signal, comprising:
   providing the gas generator having a gas discharging port formed in a housing thereof;
   providing ignition means including first and second igniters activated by an electrical activation-signal;
   providing each of the first and second igniters with a grounding pin electrically connected to a metal portion of the igniter and a center pin electrically connected to the grounding pin only via an electric resistance wire and the metal portion,
   the center pin of the second igniter serving as a positive electrode to receive the signal; and
   providing the ignition means in the gas generator.

* * * * *